US007837443B2

(12) United States Patent
Mikkelsen (10) Patent No.: US 7,837,443 B2
(45) Date of Patent: Nov. 23, 2010

(54) WIND TURBINE COMPRISING ENCLOSURE STRUCTURE FORMED AS A FARADAY CAGE

(75) Inventor: Per Sveigaard Mikkelsen, Sabro (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/353,796

(22) Filed: Jan. 14, 2009

(65) Prior Publication Data

US 2009/0121491 A1 May 14, 2009

Related U.S. Application Data

(63) Continuation of application No. PCT/DK2007/000357, filed on Jul. 13, 2007.

(30) Foreign Application Priority Data

Jul. 14, 2006 (DK) ............................... 2006 00981

(51) Int. Cl.
*F03D 11/00* (2006.01)
(52) U.S. Cl. ................... 416/146 R; 416/230; 416/225; 361/220
(58) Field of Classification Search ............. 416/146 R, 416/224, 225, 229 R, 230; 361/216, 220; 290/55
See application file for complete search history.

(56) References Cited

U.S. PATENT DOCUMENTS 4,965,408 A 10/1990 Chapman et al.
7,377,750 B1 * 5/2008 Costin et al. ............ 416/146 R 2005/0067532 A1 * 3/2005 Hindel et al. ........... 244/134 D

FOREIGN PATENT DOCUMENTS

| CA | 1341340 C | 2/2002 |
|----|-----------|--------|
| DE | 10252909 A1 | 5/2004 |
| EP | 1011182 A1 | 6/2000 |
| WO | 03008800 A1 | 1/2003 |

OTHER PUBLICATIONS

Curtis W. Dodd, et al., Maintainability of Wind Turbines In a Lightning Environment, 1983 International Reliability Availability Maintainability Conference, pp. 211-215, XP008085122 (5 pages).

(Continued)

*Primary Examiner*—Edward Look
*Assistant Examiner*—Dwayne J White
(74) *Attorney, Agent, or Firm*—St. Onge Steward Johnston & Reens LLC (57) ABSTRACT

The invention relates to a wind turbine comprising a rotating part including a rotor with at least one blade and a wind turbine hub with at least one enclosure structure or similar wall structure, and a stationary part including a nacelle with at least one enclosure structure or similar wall structure. At least one of said parts comprises a conductive film layer of said enclosure structure with connection to a ground potential, where said film layer forms a shield enclosing said part or parts and protects against electromagnetic fields. The invention also relates to a method to manufacture said enclosure structure.

26 Claims, 5 Drawing Sheets

OTHER PUBLICATIONS

Curtis W. Dodd, et al., Design Considerations for Lightning Protection of Wind Turbines, 1983 American Solar Energy Society, Inc., Boulder, CO, USA, 1983 pp. 687-695, XP008085118, (9 pages).

IEC, Protection Against Lightning Electromagnetic Impulse, Part I, IEC, 61312-1, 1995, XP008085138 (74 pages).

Lynbeskyttelse of vindmoller, Rekommandation 25, 1. udgave, Jan. 1999.

Brian McNiff, NREL National Renewable Energy Laboratory, Boulder, CO, Wind Turbine Lightning Protection Project 1999-2001, NREL/SR-500-31115, May 2002 (100 pages).

J. Lynch, et al, NREL National Renewable Energy Laboratory, Boulder, CO, Turbine Research Program Cold Weather Turbine Project May 27, 1999-Mar. 31, 2004, NREL/SR-500-36289, Aug. 2004 (38 pages).

Paul Kennedy, Use of Metal-plated Fibres Growing, Reinforced Plastics, Elsevier Advanced Technology, New York, NY vol. 49, No. 2, Feb. 2005, p. 16, XP004758084 (1 page).

International Search Report and Written Opinion of the International Searching Authority, Nov. 2, 2007, (15 pages).

* cited by examiner

WIND TURBINE COMPRISING ENCLOSURE STRUCTURE FORMED AS A FARADAY CAGE

CROSS-REFERENCE TO RELATED APPLICATIONS

The present application is a continuation of pending International patent application PCT/DK2007/000357 filed on Jul. 13, 2007 which designates the United States and claims priority from Danish patent application PA 2006 00981 filed on Jul. 14, 2006, the content of which is incorporated herein by reference.

FIELD OF THE INVENTION

The invention relates to a wind turbine comprising enclosure structure and a method to manufacture said enclosure structure.

BACKGROUND OF THE INVENTION

Especially lightning current generates radiated electromagnetic fields in a wind turbine to which sensitive electronic equipment e.g. microcontrollers may be exposed to. Hereby the electromagnetic field may cause significant damage to the electronic equipment due to electromagnetic induction of current in the equipment which can result in malfunctions of the wind turbine.

Previously, different forms of Faraday cages have been applied to wind turbine parts and especially sections within the parts such as full metal or chicken mesh constructions connected to a ground potential.

One problem of the prior art is to achieve an electromagnetic protection which is both practical and effective as a result of restrictions in design of the Faraday cage.

Another problem is that the Faraday cage construction of prior art is sensitive to constant physical influences e.g. vibrations of the nacelle resulting in fatigue fractures on the construction of the cage whereby the shielding capabilities will be limited.

The object of the present invention is to establish a technique without the above mentioned problems and especially to provide a wind turbine with a sufficient shielding against the incoming radiation of electromagnetic waves occurring from a lightning strike. The invention also relates to a method of manufacturing a wind turbine.

SUMMARY OF THE INVENTION

The invention provides a wind turbine comprising
a rotating part including a rotor with at least one blade and a wind turbine hub with at least one enclosure structure or similar wall structure, and
a stationary part including a nacelle with at least one enclosure structure or similar wall structure,
At least one of said parts comprises a conductive film layer of said enclosure structure with connection to a ground potential and where said film layer forms a shield enclosing said part or parts and protects against electromagnetic fields.

With the term "film" is meant a separate continuous layer appearing at and/or applied to a structure or covering a structure.

Hereby it is ensured that equipment located on the inside of said shield is protected against incoming radiated electromagnetic fields that occur at said enclosure structure.

As an example a lightning that strikes a wind turbine lightning conductor may result in generation of lightning current which in turn may generate a radiated electromagnetic field along the lightning conductor to which sensitive electronic equipment e.g. microcontrollers located nearby can be exposed to. Hereby the electromagnetic field may cause significant damage to said electronic equipment due to electromagnetic induction of current in said equipment which in turn can cause physical damage to the equipment it self and in worst case result in malfunction of a wind turbine.

By covering existing wall structures enclosing rotating and/or stationary parts e.g. the hub and/or the nacelle with a film layer of conductive material and connect said structures to a ground potential, it is possible to form a shielding construction that literally encloses said parts whereby a maximal shielding of sensitive equipment located inside the shield can be obtained which in turn establish an optimal protection of said equipment against induction of current from incoming radiated electromagnetic fields.

Furthermore it is ensured that electromagnetic fields generated inside said rotating and/or stationary part is effectively damped and does not cause radiation of said fields to the ambient environment.

In one aspect of the invention said conductive film layer is applied to the inner or outer surface of said enclosure structure whereby it is ensured that applying said film can be done as a finishing and/or after treatment easing the manufacturing process of said enclosure structure. Furthermore it is ensured that the applied film layer does not conflict with the constructional properties of the basic enclosure structure construction.

In another aspect of the invention said surface is the cover of the nacelle and/or hub covering a strengthening structure of the nacelle and/or hub e.g. the glass fibre cover of the nacelle and/or hub.

In another aspect of the invention said shield forms a Faraday cage.

With the term "Faraday cage" is meant an enclosure structure designed to exclude or reflect incoming radiated electromagnetic fields by making a conductive enclosure around the protected equipment with reference to e.g. ground potential. The shielding capability of said Faraday cage is dependent of numerous parameters e.g. the frequency of the field it has to shield against. Holes in the surface of said Faraday cage limit its shielding capability i.e. in order to achieve an effective shielding the holes in the surface must be significantly smaller than the wavelength of the radiation that is to be kept out.

In another aspect of the invention said conductive film layer is covered by a protective coating layer such as a PVC layer. Hereby it is ensured that said conductive film layer is protected against physical damages e.g. corrosion and scratches which in turn limit its shielding capability against incoming radiated electromagnetic fields.

In yet another aspect of the invention said at least one of said parts further comprises a layer of radar neutral construction. E.g. cladding the wind turbine nacelle with appropriate radar absorptive material can significantly reduce disturbing reflected electromagnetic energy from the nacelle which e.g. will be interpreted as clutter by one or more radars in the vicinity of the wind turbine. Furthermore a substantially similar effect can be achieved by designing reflective parts of the nacelle to reflect substantially all incoming RF-energy such as radar-radiation, in other directions than the direction of the incoming energy.

In another aspect of the invention said conductive film layer is a conductive foil such as a conductive metal foil comprising aluminium, copper, zinc or similar conductive materials. By using conductive foil as a conductive film layer it is ensured that an effective shielding can be established.

Furthermore the use of conductive foil for shielding purposes is a well known technique and experiences here from can be used.

In another aspect of the invention said conductive film layer is a conductive wire mesh made of conductive wires such as carbon-fibre wires or similar fibres and/or conductive metal materials wires comprising aluminium, copper, zinc or similar conductive metal materials. By using a conductive wire mesh made of conductive wires as a conductive film layer it is ensured that a material that physically may be more flexible is used in forming said shield. Furthermore it is ensured that the total weight of said film layer and hereby said enclosure structure may be reduced.

In yet another aspect of the invention said conductive film layer is a radar neutral material. By radar neutral material is meant that the construction of said material is of such behaviour that radar located in the vicinity of the wind turbine and radiating radar-RF energy in the direction of the wind turbine, will receive a degraded amount or substantially no radar-RF energy reflected from the material at its receiver. It is hereby ensured that substantially no reflected energy from the wind turbine is disturbing said radar receiver.

In another aspect of the invention said conductive film layer is a coating applied as paint, comprising a conductive material such as graphite, aluminium, copper, zinc or similar conductive materials. Hereby it is ensured that the film layer can be applied in a smooth and uniform layer ensuring that no sharp points or edges stitch out from the surface of said enclosure structure, giving an enhanced safety to persons working with said structures.

In another aspect of the invention said conductive film layer is a coating applied as powder coating comprising a conductive material such as graphite, aluminium, copper, zinc or similar conductive materials. Hereby it is ensured that the film layer can be applied in a smooth and uniform layer ensuring that no sharp points or edges stitch out from the surface of said enclosure structure, giving an enhanced safety to persons working with said structures.

In another aspect of the invention said conductive film layer is established as combinations of different types such as a conductive metal foil comprising copper and a conductive wire mesh comprising aluminium or similar combinations. Hereby it is ensured that different types of conductive film layer can be applied to the structures and/or different parts of said structure where each type is best suitable still all in all establishing an effective shielding.

In another aspect of the invention said enclosure structure is made of at least two enclosure parts such as a nacelle enclosure divided in a number of enclosure parts. Hereby an easier manufacturing and assembling of said enclosure structure parts is ensured still preserving the full enclosure structure.

In another aspect of the invention said enclosure parts are electrically connected through a contact area on said enclosure parts such as by direct surface to surface contact, by flat spring to surface contact, by male/female connectors, by a conductive gasket or similar contact methods. Hereby it is ensured that said enclosure parts constituting said enclosure structure leaves no or substantially no holes in the surface of said conductive shield whereby its capability to protect against electromagnetic radiation is preserved. Furthermore it is ensured that said contact area preserves an effective electrically contact despite of changing ambient conditions such as vibrations, humidity and temperature.

In another aspect of the invention said enclosure parts are electrically connected by conductive adhesive means. Hereby it is ensured that said contact area preserves an effective electrically contact despite of changing ambient conditions such as vibrations, humidity and temperature.

In another aspect of the invention said conductive film layer is connected to the lightning conductor system of said at least one wind turbine rotor blade. Hereby it is ensured that said enclosure structure is a part of the total lightning conducting system.

The invention also relates to a method to manufacture at least one enclosure structure of a wind turbine according to any of claims 1 to 14.

In one aspect of the invention said method to manufacture at least one enclosure structure of a wind turbine said conductive film layer is applied to said enclosure structure, said method comprises steps of placing a conductive film layer on the surface of said enclosure structure, cover said enclosure structure with an airtight foil forming a airtight container, and apply vacuum inside said container Hereby it is ensured that said conductive film layer can be formed, positioned and fixed to said enclosure structure in a more uniform way. This ensures that said film layer is applied without significant vulnerable inequalities which may cause degeneration of said layer resulting in limited shielding capacities.

The invention also relates to a wind turbine comprising one or more wind turbine components with at least one enclosure structure wherein a shield material is used for reducing or removing radiation of HF signal.

In another aspect of the invention, said shield material is radar neutral material.

In yet another aspect of the invention, said shield material protects against electromagnetic fields.

In an even further aspect of the invention, said shield material is radar neutral material and protects against electromagnetic fields.

In another aspect of the invention, said one or more wind turbine components is a wind turbine nacelle.

BRIEF DESCRIPTION OF THE DRAWINGS

The invention will be described in the following with reference to the figures in which.

DETAILED DESCRIPTION OF THE INVENTION

Figure 1:
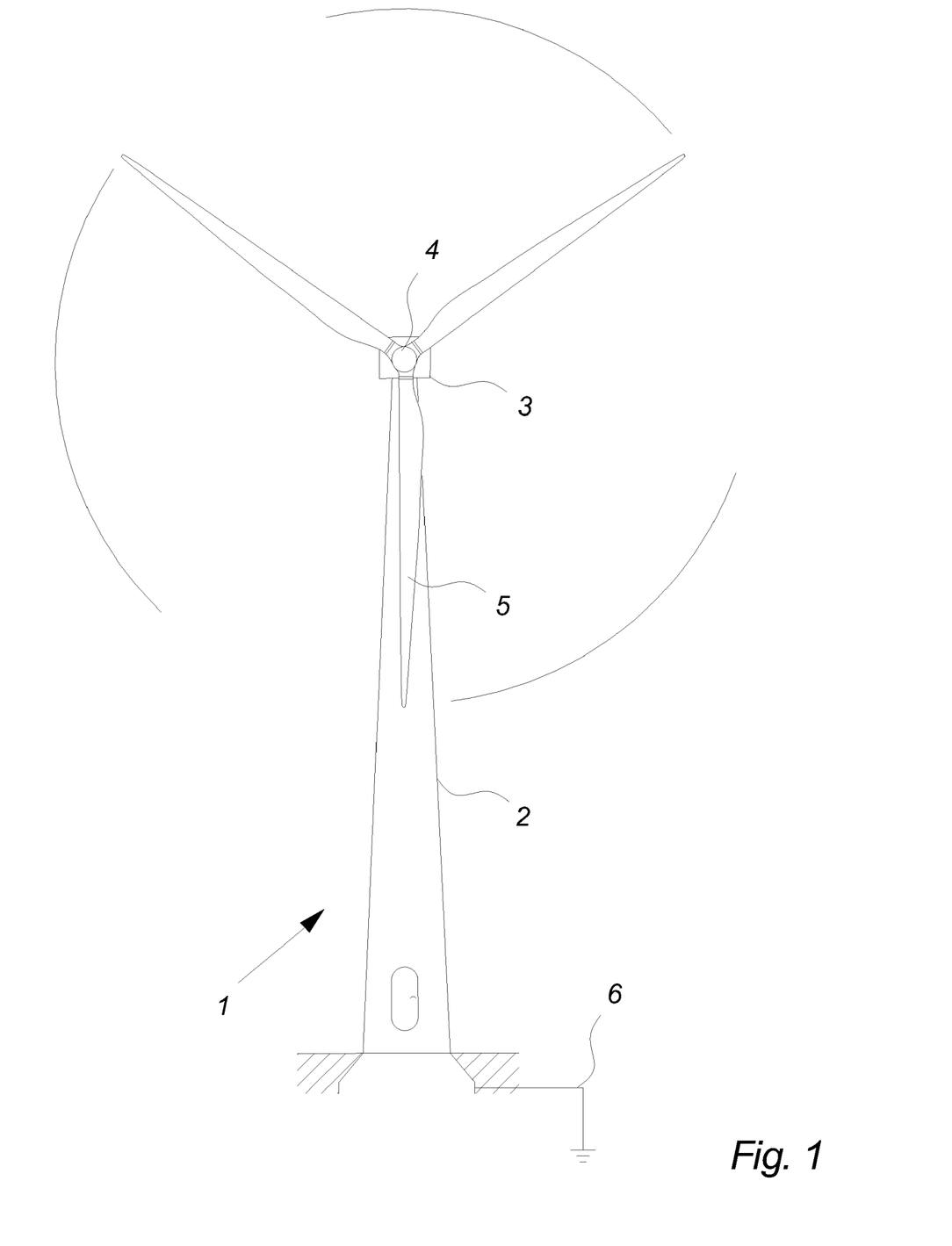
FIG. 1 illustrates a large modern wind turbine as seen from the front.

FIG. 1 illustrates a modern wind turbine 1. The wind turbine 1 comprises a tower 2 positioned on a foundation. A wind turbine nacelle 3 with a yaw mechanism is placed on top of the tower 2.

A low speed shaft extends out of the nacelle front and is connected with a wind turbine rotor through a wind turbine hub 4. The wind turbine rotor comprises at least one rotor blade e.g. three rotor blades 5 as illustrated.

The wind turbine comprises a lightning protection system with the purpose of conducting the current of a lightning to ground potential 6 when the wind turbine experiences a strike. The lightning protection system comprises receptors at the blade tip, a down conductor at the surface of or inside the blade or blades, a transfer area to a stationary part of the wind turbine, and a down conductor to ground potential 6.

Figure 2:
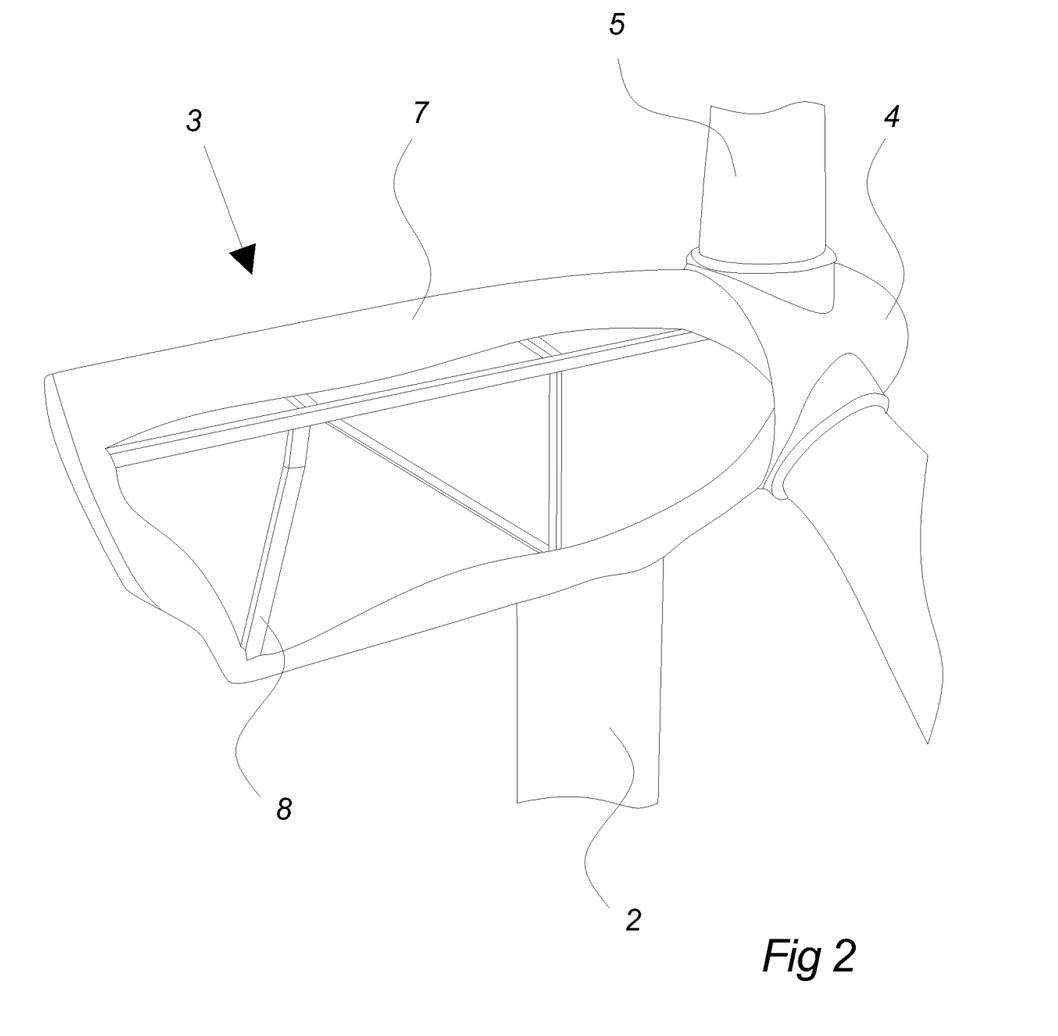
FIG. 2 illustrates a nacelle cover structure enclosing the bearing construction of the nacelle.

FIG. 2 illustrates schematically a view of a wind turbine nacelle 3 and the hub 4 located on a tower 2 including cover parts 7 surrounding the load bearing construction 8 of said nacelle 3 and hub 4. Conventionally cover parts 7 are made of a compound material such as reinforced plastic or fiberglass. They are designed in such a way that the internal components are fully protected against various ambient conditions. Furthermore the covers ensure adequate noise dampening.

Figure 3:
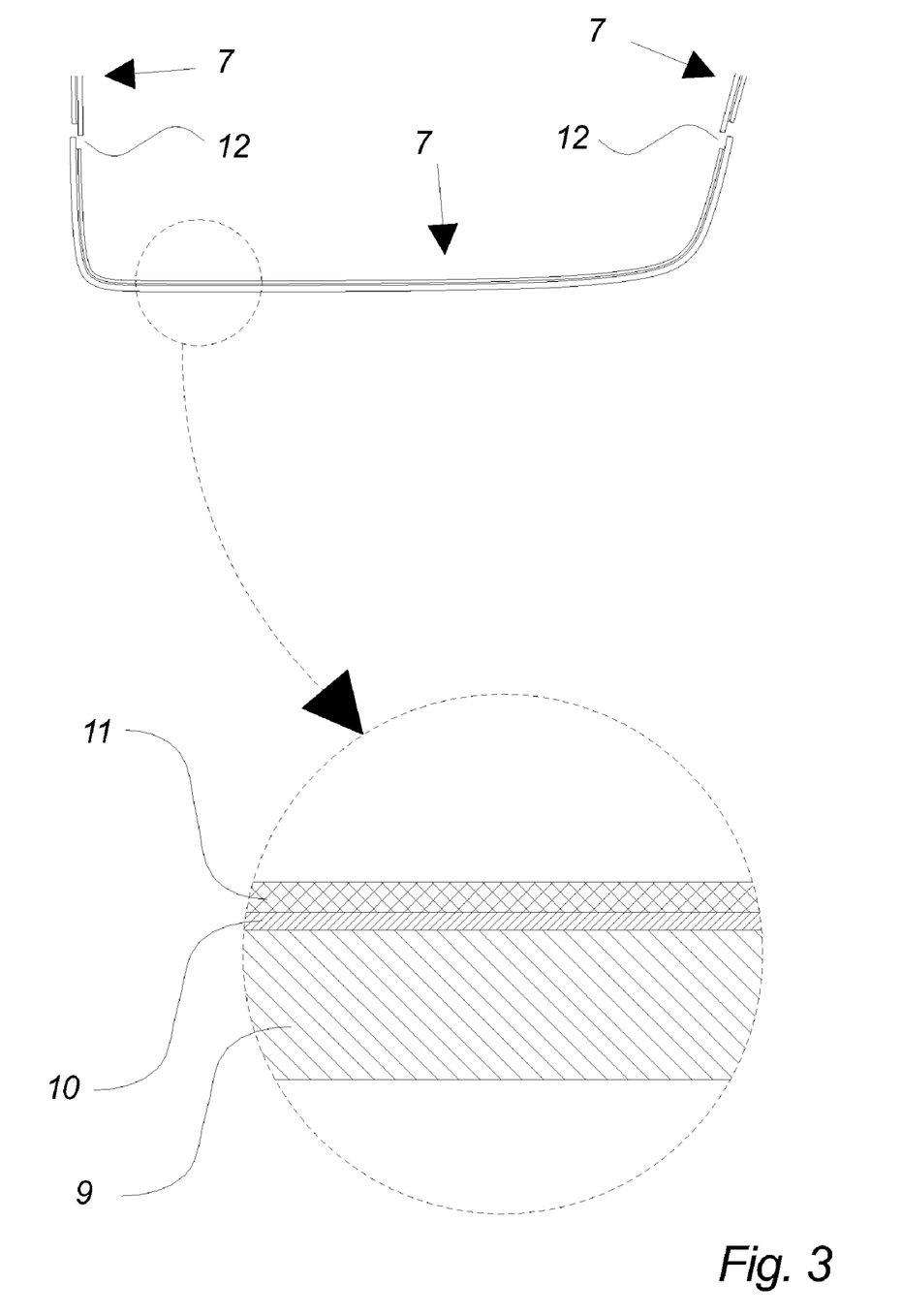
FIG. 3 illustrates the construction of the wall of one cover part in one embodiment of the invention.

FIG. 3 illustrates schematically the construction of the wall of one said cover part 7 in one embodiment of the invention. The construction comprises a basic reinforced plastic or fiberglass construction 9, a conductive layer 10 and an optional protective coating layer 11. By lining said cover parts 7 with a conductive material 10 and ensure an adequate electrical connection between separate cover parts 7 at the contact area 12 said nacelle cover will in all form a protective shield against electromagnetic radiation.

In one embodiment said protective shield is formed as a Faraday cage.

Lightning current generates a radiated electromagnetic field along the lightning conductor to which sensitive electronic equipment e.g. microcontrollers located inside the nacelle 3 can be exposed to.

By establishing an adequate connection between said protective shield/Faraday cage and the wind turbine lightning protection system to ground potential 6, a protection of e.g. said electronic equipment against incoming radiated electromagnetic fields can be ensured.

In yet another aspect of the invention said at least one of said parts further comprises a layer of radar neutral construction. E.g. cladding the wind turbine nacelle with appropriate radar absorptive material can significantly reduce disturbing reflected electromagnetic energy from the nacelle which e.g. will be interpreted as clutter by one or more radars in the vicinity of the wind turbine. Furthermore a substantially similar effect can be achieved by designing reflective parts of the nacelle to reflect substantially all incoming RF-energy such as radar-radiation, in other directions than the direction of the incoming energy.

In another embodiment of the invention, the conductive layer 10 is a radar neutral construction. E.g. cladding the wind turbine nacelle with appropriate radar absorptive material can significantly reduce disturbing reflected electromagnetic energy from the nacelle which will be interpreted as clutter by one or more radars in the vicinity of the wind turbine.

Furthermore a substantially similar effect can be achieved by designing reflective parts of the nacelle to reflect substantially all incoming RF-energy such as radar-radiation, in other directions than the direction of the incoming energy.

In another embodiment of the invention, the cover parts 7 comprise a separate layer of radar neutral material.

In a further embodiment of the invention, said conductive layer 10 and said radar neutral material are connected such as in a mesh-like construction, where some parts of the mesh constitutes said conductive layer 10, and other parts of the mesh constitutes a radar absorptive layer.

For various embodiments one or more layers of one or more of nacelle cover parts 7 is designed to reflect substantially all incoming RF-energy such as radar-radiation, in other directions than the direction of the incoming energy.

Figure 4A:
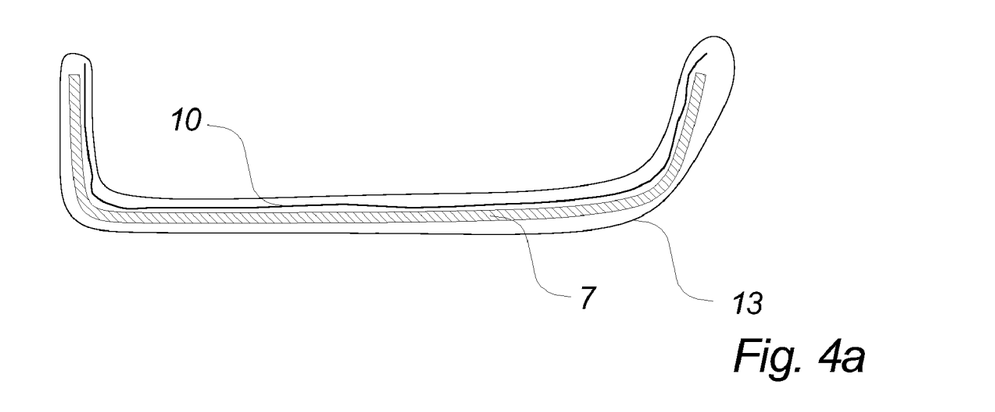
FIGS. 4a and 4b illustrates for one embodiment a method for applying a conductive layer on a cover part.

FIG. 4a illustrates for one embodiment of the invention how to apply the conductive layer 10 to the surface of a cover part 7. Said conductive layer 10 is placed on the inside surface of a cover part 7 and covered with an airtight foil 13. Vacuum is applied beneath said airtight foil 13 and as indicated by arrows in FIG. 4b the atmospheric pressure will form, position and fix the conductive layer 10 to the surface of said cover part 7.

Figure 4B:
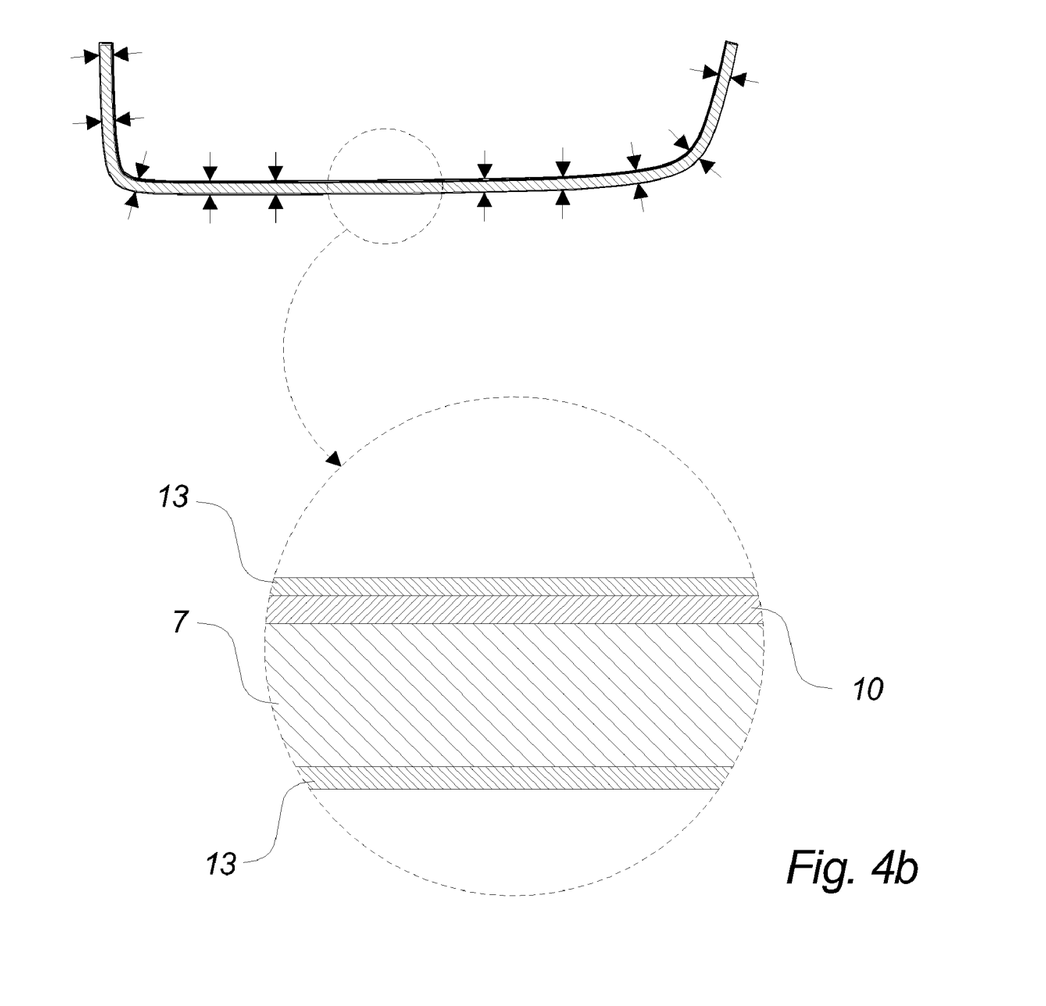

The process of applying the conductive layer to the surface of a cover part 7 may be performed at the location of manufacturing the cover parts 7.

Figure 5A:
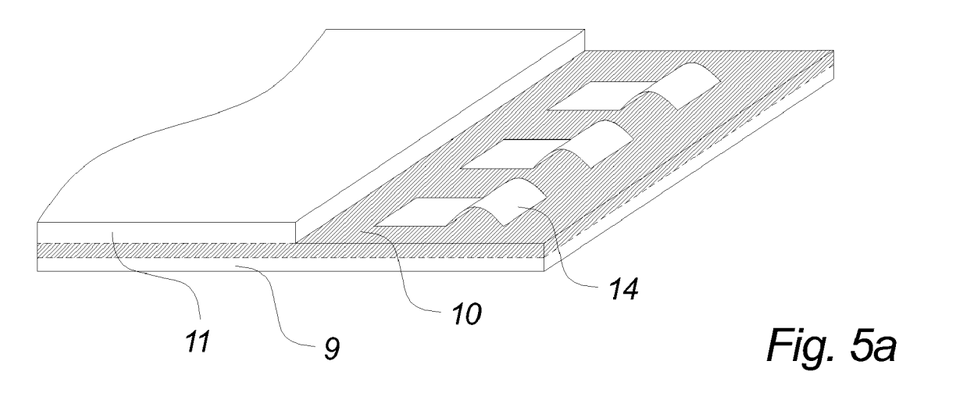
FIG. 5a illustrates for one embodiment of a contact area exposed on one cover part.

FIG. 5a illustrates schematically one embodiment of a contact area 12 exposed on one cover part 7. The main purpose of the contact area 12 is to establish an effective connection between attached cover parts 7 in order to form said Faraday cage that shield against incoming electromagnetic radiation. To achieve this a sufficient contact must be established along the whole contact area 12 between attached cover parts 7 as any hole or broken surfaces in the Faraday cage will limit its shielding capabilities dependent on the wavelength of the radiation i.e. the holes in the surface must be significantly smaller than the wavelength of the radiation that is to be kept out.

In this embodiment said contact area comprises contact via flat springs 14 on attached cover parts 7, each of them connected to said conductive layer 10. Numerous types of means for making contact between cover parts 7 is possible e.g. by use of said flat springs 14, by conductive gaskets or conductive paste applied on said contact area 12.

Furthermore this embodiment comprises a protective coating layer 11 applied to the cover parts 7 except at the contact areas 12.

Figure 5B:
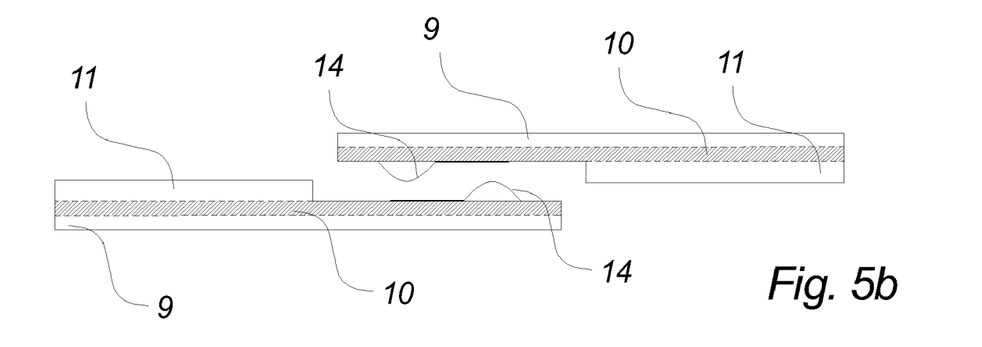
FIGS. 5b and 5c illustrates for one embodiment a side view of a contact area of two cover parts being brought together.
Figure 5C:
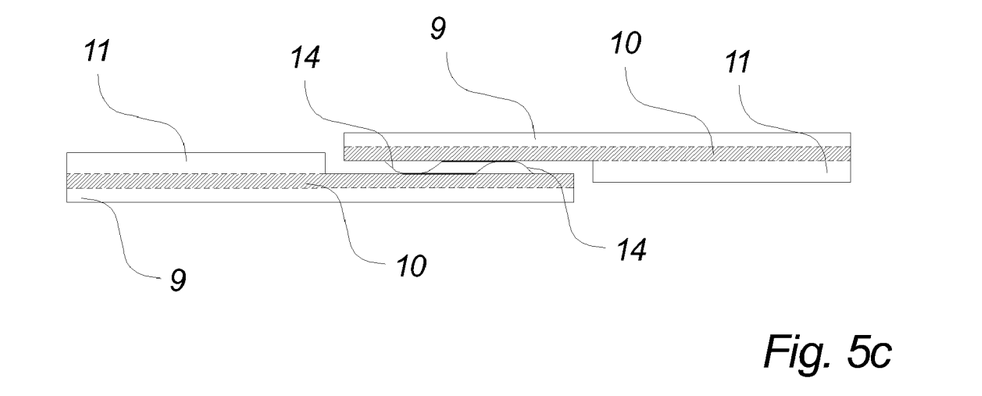

FIGS. 5b and 5c illustrates for said embodiment a side view of a contact area 12 of two cover parts 7 being brought together. The flat springs 14 builds up the connection between cover parts 7 and ensure a sufficient electrical coupling between said cover parts 7.

What is claimed is:

1. A wind turbine comprising:
   a rotating part including a rotor with at least one blade and a wind turbine hub with at least one enclosure structure or similar wall structure,
   a stationary part including a nacelle with at least one enclosure structure or similar wall structure, wherein
   each of said rotating part enclosure structure and said stationary part enclosure structure comprises a conductive film layer with connection to a ground potential, where said conductive film layer forms a shield enclosing said rotating part enclosure structure and said stationary part enclosure structure and protects against electromagnetic fields.

2. The wind turbine according to claim 1, wherein said conductive film layer is applied to the inner or outer surface of said rotating part enclosure structure and said stationary part enclosure structure.

3. The wind turbine according to claim 2, wherein said surface is a cover of said nacelle and said hub, covering a strengthening structure of said nacelle and said hub.

4. The wind turbine according to claim 1, wherein said shield forms a Faraday cage.

5. The wind turbine according to claim 1, wherein said conductive film layer is covered by a protective coating layer.

6. The wind turbine according to claim 1, wherein said rotating part enclosure structure and said stationary part enclosure structure further comprise a layer of radar neutral construction.

7. The wind turbine according to claim 1, wherein said conductive film layer is a conductive foil.

8. The wind turbine according to claim 1, wherein said conductive film layer is a conductive wire mesh made of conductive wires.

9. The wind turbine according to claim 1, wherein said conductive film layer is a radar neutral material.

10. The wind turbine according to claim 1, wherein said conductive film layer is selected from the group consisting of metal foil, wire mesh, paint, powder coating, and any combination thereof.

11. The wind turbine according to claim 1, wherein each of said rotating part enclosure structure and said stationary part enclosure structure is made of at least two enclosure parts.

12. The wind turbine according to claim 11, wherein said at least two enclosure parts are electrically connected through a contact area on said at least two enclosure parts.

13. The wind turbine according to claim 11 wherein said at least two enclosure parts are electrically connected by conductive adhesive means.

14. The wind turbine according to claim 1, wherein said conductive film layer is connected to a lightning conductor system of said at least one wind turbine rotor blade.

15. A method for manufacturing a wind turbine comprising of the steps of:
  making a rotating part including a rotor with at least one blade and a wind turbine hub with at least one enclosure structure or similar wall structure,
  making a stationary part including a nacelle with at least one enclosure structure or similar wall structure,
  applying a conductive film layer to each of said rotating part enclosure structure and said stationary part enclosure structure with connection to a ground potential, where said conductive film layer forms a shield enclosing said rotating part enclosure structure and said stationary part enclosure structure and protects against electromagnetic fields.

16. The method according to claim 15, wherein said conductive film layer is applied to the inner or outer surface of a cover of said nacelle and said hub in order to establish a Faraday cage.

17. The method according to claim 15, wherein said conductive film layer is a conductive foil.

18. The method according to claim 17, wherein said method further comprises the steps of:
  placing a conductive film layer on the surface of said enclosure structure,
  cover said enclosure structure with an airtight foil forming a airtight container, and
  apply vacuum inside said container
in order to form, position and fix said conductive layer to said surface of said rotating part enclosure structure and said stationary part enclosure structure.

19. The method according to claim 15 wherein said conductive film layer is a conductive wire mesh made of conductive wires.

20. The method according to claim 15, wherein said conductive film layer is a coating applied as paint comprising a conductive material.

21. The method according to claim 15, wherein said conductive film layer is a coating applied as powder coating comprising a conductive material.

22. The method according to claim 15, wherein said conductive film layer is selected from the group consisting of metal foil, wire mesh, paint, powder coating, and any combination thereof.

23. The method according to claim 15, wherein said conductive film layer is covered by a protective coating layer.

24. The method according to claim 15, wherein said enclosure structure is made of at least two enclosure parts.

25. The method according to claim 24, wherein said at least two enclosure parts are electrically connected through a connector-area on said at least two enclosure parts.

26. The method according to claim 24 wherein said at least two enclosure parts are electrically connected by conductive adhesive means.

* * * * *